United States Patent
Crighton et al.

(10) Patent No.: US 12,149,020 B2
(45) Date of Patent: Nov. 19, 2024

(54) CABLE INTERFACE DEVICE AND MOUNTING ASSEMBLY

(71) Applicant: MOLEX, LLC, Lisle, IL (US)

(72) Inventors: Alan Crighton, Austin, TX (US);
Bruce Reed, Maumelle, AR (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/571,746

(22) PCT Filed: Jul. 14, 2023

(86) PCT No.: PCT/IB2023/057219
§ 371 (c)(1),
(2) Date: Dec. 19, 2023

(87) PCT Pub. No.: WO2024/013710
PCT Pub. Date: Jan. 18, 2024

(65) Prior Publication Data
US 2024/0266778 A1 Aug. 8, 2024

Related U.S. Application Data

(60) Provisional application No. 63/368,438, filed on Jul. 14, 2022.

(51) Int. Cl.
*H01R 13/518* (2006.01)
*G06F 1/18* (2006.01)
(Continued)

(52) U.S. Cl.
CPC ........... *H01R 13/518* (2013.01); *G06F 1/186* (2013.01); *G06F 1/187* (2013.01); *H01R 12/721* (2013.01); *H01R 13/514* (2013.01)

(58) Field of Classification Search
CPC .... H01R 13/46; H01R 13/514; H01R 13/516; H01R 13/518; H01R 12/70; H01R 12/71;
(Continued)

(56) References Cited

U.S. PATENT DOCUMENTS

| | | |
|---|---|---|
| 6,241,534 B1 | 6/2001 | Neer et al. |
| 2019/0245288 A1 | 8/2019 | Lloyd et al. |

(Continued)

FOREIGN PATENT DOCUMENTS

| | | |
|---|---|---|
| CN | 2713685 Y | 7/2005 |
| TW | M612289 U | 5/2021 |

OTHER PUBLICATIONS

International Search Report and Written Opinion issued in PCT Application No. PCT/IB2023/057219, mailed on Oct. 18, 2023, 11 pages.

*Primary Examiner* — Khiem M Nguyen

(57) ABSTRACT

Cable interface devices and mounting assemblies are provided for data storage assemblies. A data storage assembly can include media, such as a solid-state drive, a cable interface housing, and a cable interface housing locating feature. A cable interface device is mounted within the cable interface housing. The cable interface device includes a body extending in a first direction that defines an opening at the front side with a protruding connector of a solid-state drive extended through the opening. The cable interface device further includes electrically conductive contacts at least partially disposed inside the body and exposed to the opening. The cable interface device also includes a cable interface device locating feature positioned on, or defined by, the body and complementary in shape to the cable interface housing locating feature, to collectively locate the cable interface device within the cable interface housing.

21 Claims, 10 Drawing Sheets

(51) Int. Cl.
*H01R 12/72* (2011.01)
*H01R 13/514* (2006.01)

(58) Field of Classification Search
CPC ......... H01R 12/72; H01R 12/721; G06F 1/18; G06F 1/183; G06F 1/185; G06F 1/186
USPC .......................................................... 439/65
See application file for complete search history.

(56) References Cited

U.S. PATENT DOCUMENTS

| | | |
|---|---|---|
| 2019/0272008 A1 | 9/2019 | Ping |
| 2020/0028288 A1 | 1/2020 | Chen |
| 2021/0007235 A1 | 1/2021 | Nelson et al. |

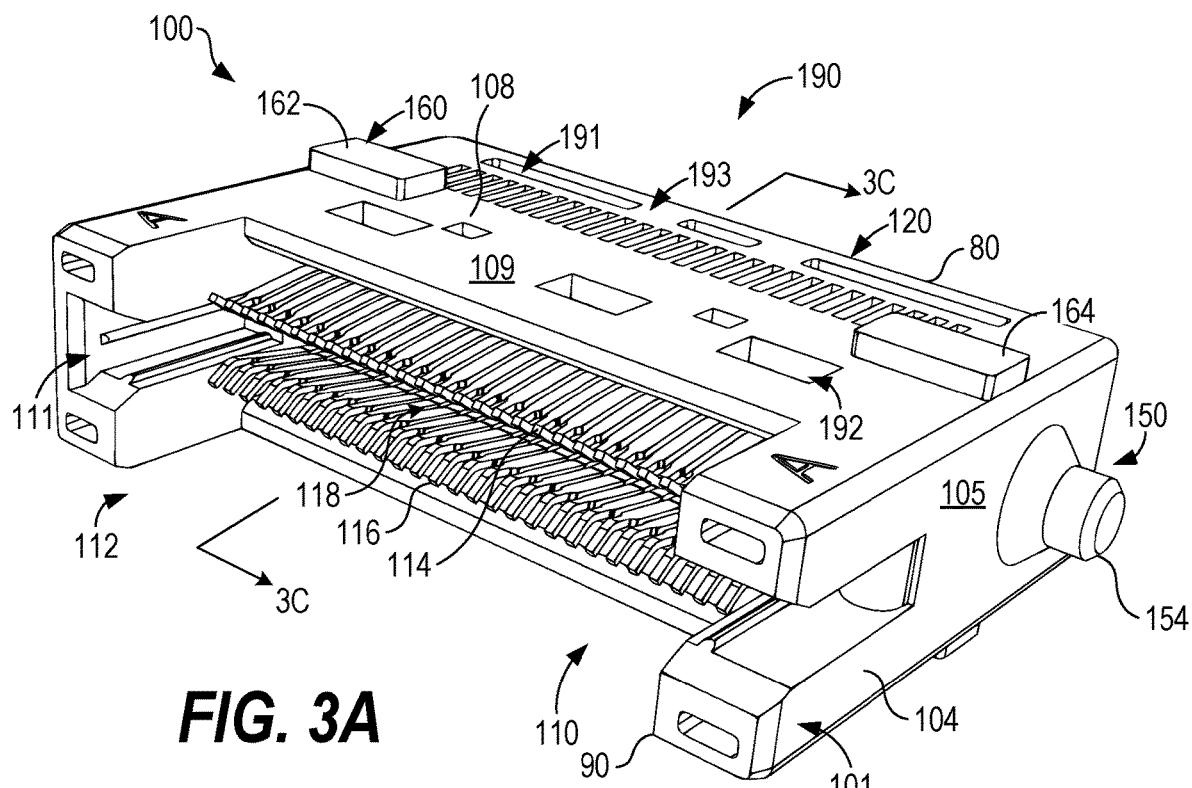
FIG. 3A
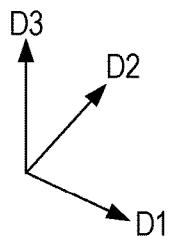

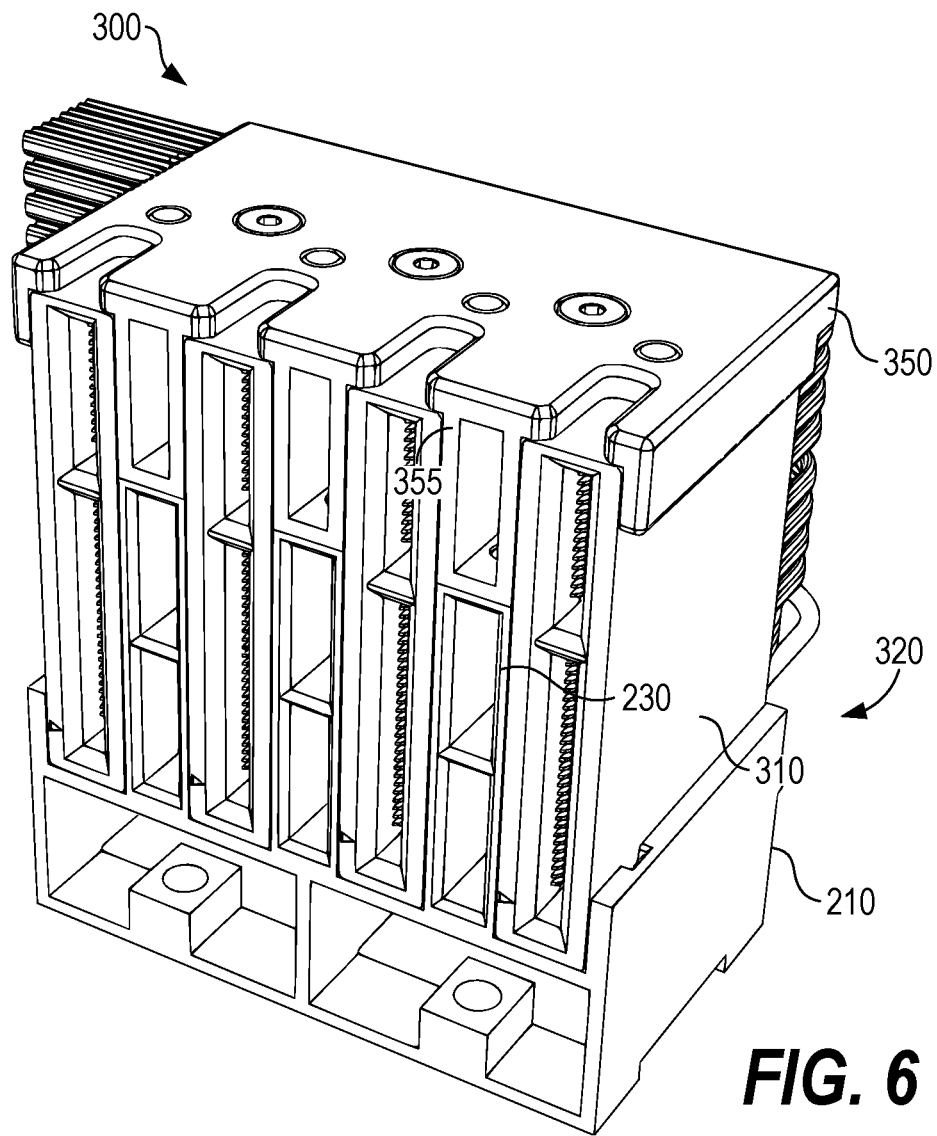
FIG. 6
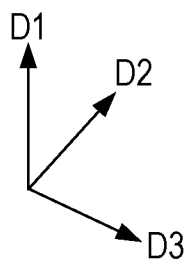

CABLE INTERFACE DEVICE AND MOUNTING ASSEMBLY

CROSS-REFERENCE TO RELATED APPLICATION

This application is a U.S. National Phase Patent Application of International Patent Application No. PCT/IB2023/057219, filed on Jul. 14, 2023, which claims the benefit of and priority to U.S. Provisional Patent Application No. 63/368,438 entitled "CABLE INTERFACE DEVICE AND MOUNTING ASSEMBLY," filed Jul. 14, 2022, the contents of which being incorporated by reference in their entirety herein.

TECHNICAL FIELD

The present disclosure relates to cable interface devices and mounting assemblies and, more particularly, to cable interface devices and mounting assemblies for utilization with solid-state drives, hard disk drives, and like components.

BACKGROUND

Cable interfaces and mounting assemblies can be used for a variety of applications. For instance, cable interfaces and mounting assemblies can be used in conjunction with data storage media such as solid-state drives or hard disk drives. The use of data storage media continues to grow and change in a variety of applications, including, but not limited to, servers. Improvements to cable interfaces and mounting assemblies to facilitate removable connection between the data storage media and any downstream network and components are beneficial.

BRIEF SUMMARY

In a first aspect, a data storage assembly is described that includes: a data storage media comprising a media body defining an end, the data storage media further comprising a protruding connector extending away from the media body at the end: a cable interface housing comprising a frame and a top housing separate from the frame, the cable interface housing further comprising or defining a cable interface housing locating feature; and a cable interface device configured to mount within the cable interface housing. The cable interface device includes a body extending in a first direction between a top wall and a bottom wall and extending in a second direction perpendicular the first direction between a front side and a back side, the body defining an opening at the front side with the protruding connector of the data storage media extended through the opening: a plurality of electrically conductive contacts at least partially disposed inside the body and exposed to the opening, the plurality of electrically conductive contacts in electrical communication with the protruding connector of the data storage media and distributed between the top wall and the bottom wall; and a cable interface device locating feature positioned on, or defined by, the body and complementary in shape to the cable interface housing locating feature, the cable interface housing locating feature and the cable interface device locating feature locating the cable interface device within the cable interface housing.

The data storage media can be a solid-state drive having an EDSFF E3 form factor, and the protruding connector can be a 1C, 2C, or 4C connector type. The top housing comprises a front edge along the front side of the cable interface device, and wherein the front edge defines a relief slot extending into the top housing in the first direction. The protruding connector is a first protruding connector; and the data storage media further comprises a second protruding connector aligned with the first protruding connector, the second protruding connector extending into the relief slot.

The cable interface housing locating feature is a top housing recess defined by the top housing of the cable interface housing: the frame defines a frame recess, and the cable interface device locating feature is a first mounting stud positioned on the top wall and extending away from the body: the cable interface device further comprises a second mounting stud positioned on the bottom wall and extending away from the body; and the first mounting stud is received within the top housing recess, and the second mounting stud is received within the frame recess. The cable interface device is a first cable interface device of a plurality of cable interface devices of the data storage assembly, and wherein each cable interface device of the plurality of cable interface devices are mounted within the cable interface housing.

In a second aspect, a cable interface device operable with a data storage media having a protruding connector is described, the cable interface device including: a body extending in a first direction between a top wall and a bottom wall and extending in a second direction perpendicular the first direction between a front side and a back side, the body defining an opening at the front side for receiving the protruding connector of the data storage media: a plurality of electrically conductive contacts at least partially disposed inside the body and exposed to the opening, the plurality of electrically conductive contacts being distributed between the top wall and the bottom wall and at least partially extend from the front side to the back side; and at least one mounting stud extending away from the body.

The at least one mounting stud comprises a first mounting stud on the top wall extending away from the body and a second mounting stud on the bottom wall extending away from the body. The first mounting stud and the second mounting stud are offset in the second direction. The at least one mounting stud comprises a flared base.

The cable interface device further includes at least one protrusion on at least one side of the body between the top wall and the bottom wall, the at least one protrusion extending away from the body. The cable interface device comprises at least two protrusions aligned in the first direction. The at least two protrusions comprises a first protrusion and a second protrusion on a first side of the body. The at least one protrusion comprises an elongated shape that extends farther in the first direction than the second direction.

The plurality of electrically conductive contacts comprises a first row of electrically conductive contacts and a second row of electrically conductive contacts; and the first row of electrically conductive contacts and the second row of electrically conductive contacts are parallel to one another and together define a gap therebetween for receiving the protruding connector. The data storage media has an EDSFF E3 form factor, and the protruding connector is one of a 1C, 2C, and 4C connector type.

In a third aspect, a mounting assembly is described, including: a cable interface housing comprising a frame and a top housing separate from the frame, the frame, the top housing, or both comprising or defining a cable interface housing locating feature; and a cable interface device, the cable interface housing at least partially surrounding the cable interface device. The cable interface devices includes: a body extending in a first direction between a top wall and a bottom wall and extending in a second direction perpendicular the first direction between a front side and a back side, the body defining an opening at the front side: a plurality of electrically conductive contacts at least partially disposed inside the body and exposed to the opening, wherein the plurality of electrically conductive contacts are distributed between the top wall and the bottom wall and at least partially extend from the front side to the back side; and a cable interface device locating feature positioned on, or defined by, the body and complementary in shape to the cable interface housing locating feature, the cable interface housing locating feature and the cable interface device locating feature configured to locate the cable interface device within the cable interface housing.

The mounting assembly is operable with a data storage media having a protruding connector, and the opening at the front side of the body of the cable interface housing is configured to receive the protruding connector. The data storage media has an EDSFF E3 form factor, and the protruding connector is one of a 1C, 2C, and 4C connector type.

The cable interface housing locating feature is a top housing recess defined by the top housing of the cable interface housing: the frame defines a frame recess; the cable interface device locating feature is a first mounting stud positioned on the top wall and extending away from the body: the cable interface device further comprises a second mounting stud positioned on the bottom wall and extending away from the body; and the first mounting stud is received within the top housing recess, and wherein the second mounting stud is received within the frame recess. The cable interface device is a first cable interface device of a plurality of cable interface devices of the mounting assembly, and wherein each cable interface device of the plurality of cable interface devices are mounted within the cable interface housing.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A depicts a perspective view of a right wall and bottom wall of a cable interface device according to example embodiments of the present disclosure.

FIG. 6 depicts another assembled mounting assembly including four cable interface devices and a cable interface housing according to example embodiments of the present disclosure.

DETAILED DESCRIPTION

Figure 1:
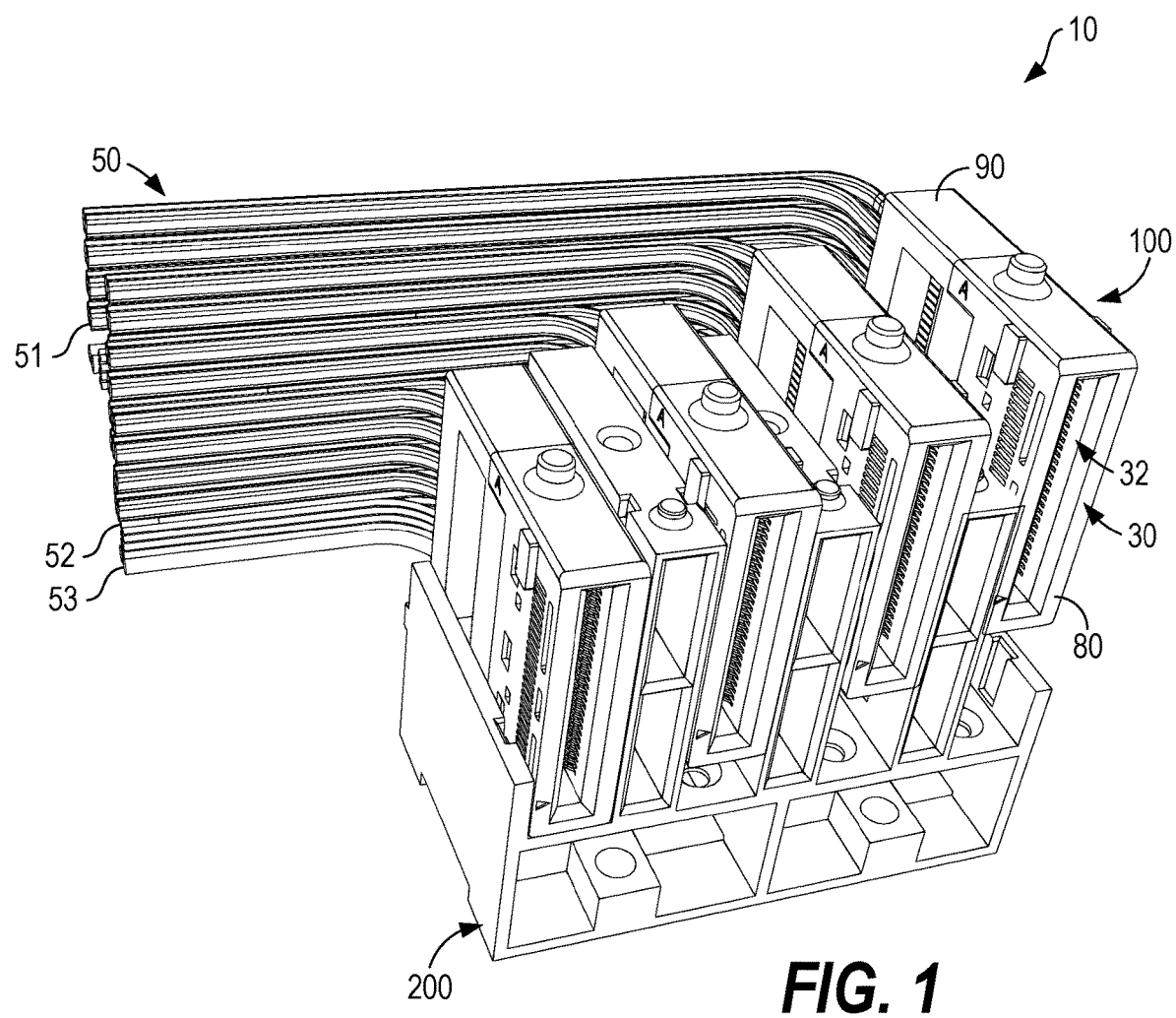
FIG. 1 depicts a perspective view of a partially assembled mounting assembly according to example embodiments of the present disclosure.

Example embodiments of the present disclosure are directed to cable interface devices and mounting assemblies. Cable interface devices and mounting assemblies can be used, for instance, to facilitate selective connections with data storage media such as solid-state drives. Increased demand in various technologies, such as servers, has led to increased requirements for data storage media. For instance, performance requirements of data storage media continues to increase with respect to storage capacity and data transfer. In turn, the form factor of data storage media is also evolving to account for the performance driven changes and overall storage system designs (e.g., server racks).

The size and shape of data storage media is in some instances becoming both smaller and thinner. Moreover, to reduce size and increase the amount of data storage media in a given space, some supplemental features such as connectors may be removed from the data storage media itself. This includes data storage media having form factors adhering to the EDSFF E3 industry specification set forth and maintained by the Storage Networking Industry Association.

However, thinner and smaller form factors may reduce mechanical integrity of individual components, thereby allowing for the individual components to become more susceptible to breakage when inserting or removing the individual components. Moreover, it can become increasingly difficult to install and uninstall various components in a data connection system due to their smaller sizes and reduced connection features. Thus, to meet the requirements of modern data storage media, it may be advantageous to provide cable interface devices and mounting assemblies, referred to herein as cable interface housings, that provide supplemental features for alignment, securement, and mechanical rigidity.

Aspects of the present disclosure can provide numerous technical effects and benefits in this regard. For instance, according to example aspects of the present disclosure, cable interface devices can include or define one or more locating features, such as mounting studs extending from a body on the top wall and bottom wall. Likewise, the cable interface housing can include or define one or more complementary locating features, such as recesses configured to receive the mounting studs of the cable interface device. The one or more mounting studs can thereby assist in the alignment and securement between the cable interface devices and the cable interface housing. The mounting studs can help align and orient the cable interface device when being inserted into the cable interface housing despite limited space and visibility. The mounting studs can further help secure the cable interface device within the cable interface housing when data storage media is inserted or removed from the cable interface device. Moreover, the mounting studs may be offset in at least one direction to further assist with locating the cable interface device within the cable interface housing.

According to another example implementation, the cable interface devices can further provide one or more protrusions on the side walls of its body. Similarly, the cable interface housing can include one or more slots configured to receive the one or more protrusions of the cable interface device. The one or more protrusions can both supplement the mechanical rigidity of the cable interface device as well as assist in the alignment and securement between the cable interface devices and the cable interface housing. These and additional benefits will become appreciated with the disclosure provided herein.

With reference now to the figures, example embodiments of the present disclosure will now be set forth.

FIG. 1 depicts a partially assembled view of a mounting assembly 10 according to example aspects of the present disclosure. The mounting assembly 10 generally includes one or more cable interface devices 100 and a cable interface housing 200, with the one or more cable interface devices 100 disposed in and secured to the cable interface housing 200, details of which will be discussed herein with respect to the subsequent figures.

Each cable interface device 100 can facilitate an electrical connection with media inserted into a connector 30 at the front side 80 of the cable interface device 100. As used herein, electrical connection refers to a connection that facilitates the flow of data, signals, power, or the like, including combinations thereof, between two or more components. The connector 30 of the cable interface device 100 will be described in more detail below. As can be appreciated from FIG. 1, however, the connector 30 defines an opening 32 at the front side 80.

The electrical connection can continue through the cable interface device 100 into a multitude of cables 50 exiting a back side 90 of the connector 30. The multitude of cables 50 can include a variety of different types and configurations depending on the application of the cable interface device 100 and the associated connection. For example, as illustrated, the cables 50 include a first group 51, a second group 52, and a third group 53 that may provide different functional connections. Exemplary functional connections include, but are not limited to, signal communications and power communication. In some examples, the first group 51 can include high-speed twinax wires, the second group 52 can include miscellaneous signal wires, and the third group 53 can include power wires, although it is understood that other examples of cables can be employed. In some embodiments, the first group 51, the second group 52, and the third group 53 have varying gauges and types of wires.

Figure 2:
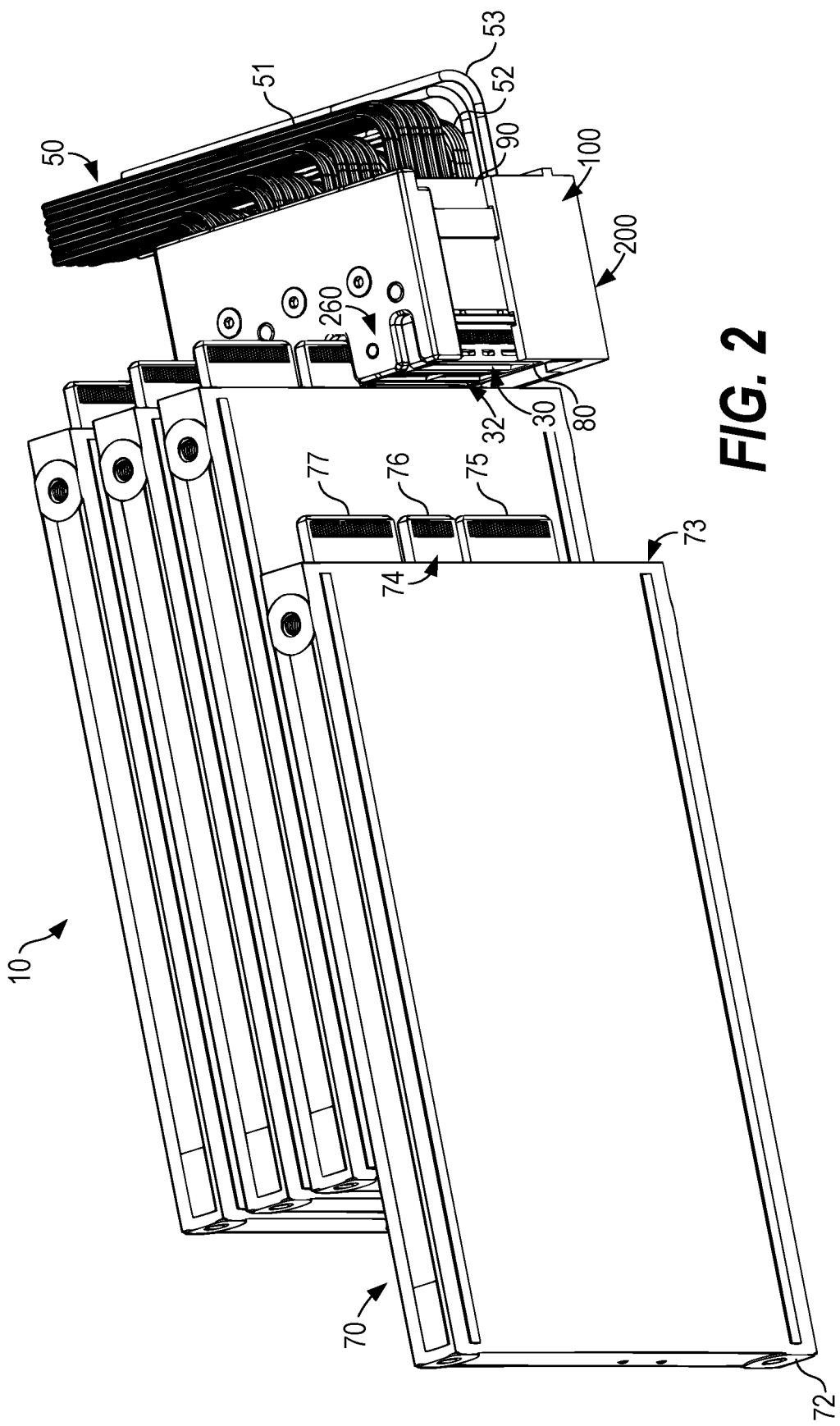
FIG. 2 depicts a perspective view of a mounting assembly with data storage media inserted therein according to example embodiments of the present disclosure.

With additional reference to FIG. 2, the mounting assembly 10 of FIG. 1 is illustrated in assembled form with four cable interface devices 100 housed in the cable interface housing 200 that can respectively coupled to four data storage media 70. The data storage media 70 is also illustrated as being selectively received by the respective cable interface devices 100 of the mounting assembly 10. The data storage media 70 and the mounting assembly 10 collectively can be referred to as a data storage assembly. More specifically, it will be appreciated from the depiction of the mounting assembly 10 in FIGS. 1 and 2, each of the cable interface devices 100 includes a connector 30, with each connector defining an opening 32 at a respective front side 80 (FIG. 1), which can receive and electrically couple to data storage media 70.

In the depicted embodiment, the data storage media 70 is configured as a solid-state data storage media (e.g., a solid-state drive or SSD) for utilization with the cable interface device 100. More specifically the data storage media 70 has a form factor adhering to EDSFF E3 industry specification. As should be appreciated, EDSFF refers to the Enterprise and Datacenter Standard Form Factor, a family of industry specifications set forth and maintained by the Storage Networking Industry Association (SNIA). Such data storage media can include E3 Short Thin, E3 Short Thick, E3 Long Thin, and E3 Long Thick form factors, among other potential form factors.

The data storage media 70 includes a body 72 and one or more data storage connectors 74, such as printed circuit boards, extending or projecting from the body 72. The body 72 houses memory (not shown) and, in some embodiments, solid-state memory such that the data storage media 70 may be referred to as a solid-state drive in some implementations. Moreover, the body 72 defines an end 73, and the data storage connectors 74 of the data storage media 70 extend away from the body 72 from the end 73 of the body 72. In such a manner, the data storage connectors 74 may be referred to as a "protruding connector."

The data storage connectors 74 and the connector 30 can be collectively configured in accordance with one or more industry connector standards. For example, in some embodiments, the one or more data storage connectors 74 and connector 30 may be configured for a 1C connector (having a first data storage connection 75), 2C connector (having a first data storage connection 75 and a second data storage connection 76), or a 4C connector as illustrated in FIG. 2 having a first data storage connection 75, a second data storage connection 76, and a third data storage connection 77, in accordance with the industry specifications set forth and maintained by SNIA. As can be appreciated, in the embodiment shown, the first data storage connection 75 (e.g., a first protruding connector), the second data storage connection 76 (e.g., a second protruding connector), and the third data storage connection 77 (e.g., a third protruding connector) each extend away from the body 72 from the end 73 of the body 72, and are aligned with one another. The first data storage connection 75, the second data storage connection 76, and the third data storage connection 77 are cantilevered with respect to internal circuitry of the data storage media 70.

As can be appreciated, e.g., from the discussion hereinbelow, the cable interface devices 100 can be designed for a specific connector type, or to provide operational flexibility by being designed to accommodate a variety of connector types. Moreover, while specific embodiments are presented herein with respect to the configuration of the connector 30, the type and/or form factor of the data storage media 70, and the types and functions of the plurality of cables 50, it should be appreciated that these are non-limiting and additional or alternative configurations may also be realized within the scope of this disclosure.

The cable interface device 100 can include a printed circuit board (PCB) or other circuit substrate housed therein.

In some embodiments, the PCB includes a passive circuit, which merely couples the cables 50 to the electrically conductive contacts 114, 116 and, when coupled to data storage media 70, to the data storage connectors 74 thereof. In alternative embodiments, the PCB can include an active circuit that performs signal conversion and processing, amplification, and so forth.

Figure 3B:
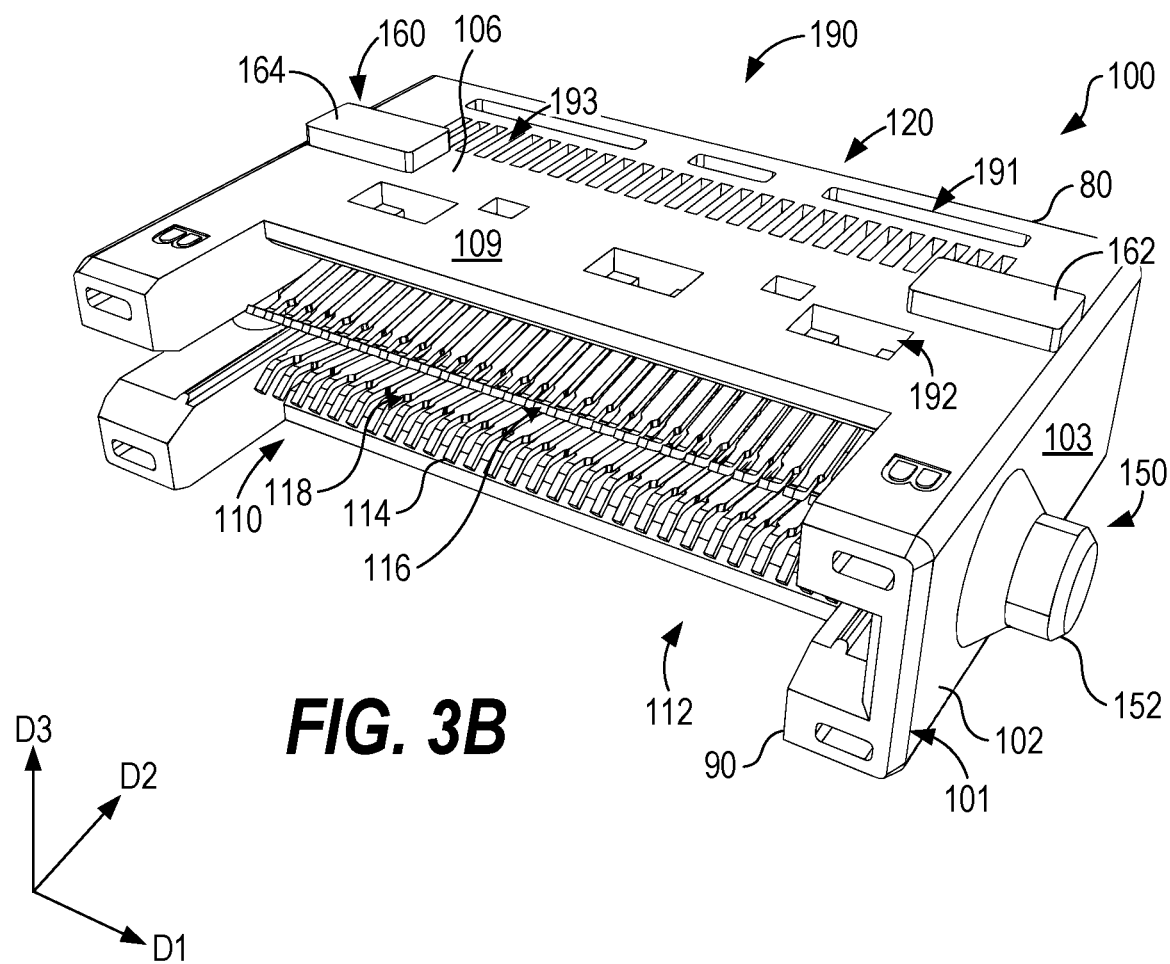
FIG. 3B depicts a perspective view of a left wall and top wall of a cable interface device according to example embodiments of the present disclosure.

With reference to FIGS. 3A and 3B, the cable interface device 100 is illustrated in perspective views in accordance with one or more exemplary embodiments. The cable interface device 100 generally includes a body 101 having a top wall 102, a bottom wall 104, a left wall 106, and a right wall 108, the body 101 defining a first direction D1, a second direction D2, and a third direction D3. The first, second, and third directions D1, D2, and D3 collectively form an orthogonal coordinate system. It should also be appreciated that the terms "top," "bottom," "left," and "right" are terms of convenience and do not denote a restrictive orientation. The body 101 extends in the first direction D1 between the top wall 102 and the bottom wall 104, extends in the second direction D2 between the front side 80 and the back side 90, and extends in the third direction D3 between the left wall 106 and the right wall 108 between the top wall 102 and the bottom wall 104. Between the left wall 106 and the right wall 108, the body 101 defines an interior cavity 111 connected with the opening 32.

The cable interface device 100 further includes a multitude of electrically conductive contacts 110. The body 101 houses the plurality of electrically conductive contacts 110 at least partially within the interior cavity 111. When the data storage connectors 74 of the data storage media 70 are received within the opening 32 of the connector 30 of the cable interface device 100, the positioning of the electrically conductive contacts 110 facilitate and mechanically support an electrical connection with the data storage media 70 (FIG. 2).

The electrically conductive contacts 110 include multiple conductive elements exposed to the interior cavity 111 (and thus the opening 32; see, e.g., FIG. 2) that partially extend through the body 101 to provide a plurality of conducting paths between an input end 120 and an output end 112 for facilitating a connection between devices electrically coupled thereto. The input end 120 and the output end 112 refer to respective ends of the conductive pathways provided by the plurality of electrically conductive contacts 110. While the terms "input" and "output" are used for illustrative convenience, it should be appreciated that the flow of data, signals, power, or the like may not necessarily adhere to a single direction from the input end 120 to the output end 112. Rather, input end 120 and output end 112 are exemplarily used for illustrative purposes only, such as with potential data storage media 70 (FIG. 2) being selectively inserted and removed at the input end 120.

The electrically conductive contacts 110 are distributed between the top wall 102 and the bottom wall 104. That is, the plurality of electrically conductive contacts 110 are distributed along the first direction D1 such that multiple electrically conductive contacts 110 are disposed between the top wall 102 and the bottom wall 104. The distribution of the plurality of electrically conductive contacts 110 may be uniform, non-uniform, or include any configuration to accommodate the intended connection type. In the embodiment depicted, the plurality of electrically conductive contacts 110 include a first row of electrically conductive contacts 114 and a second row of electrically conductive contacts 116. The first row of electrically conductive contacts 114 and the second row of electrically conductive contacts 116 are parallel to one another and have equal distances between individual ones of the electrically conductive contacts 100.

Figure 3C:
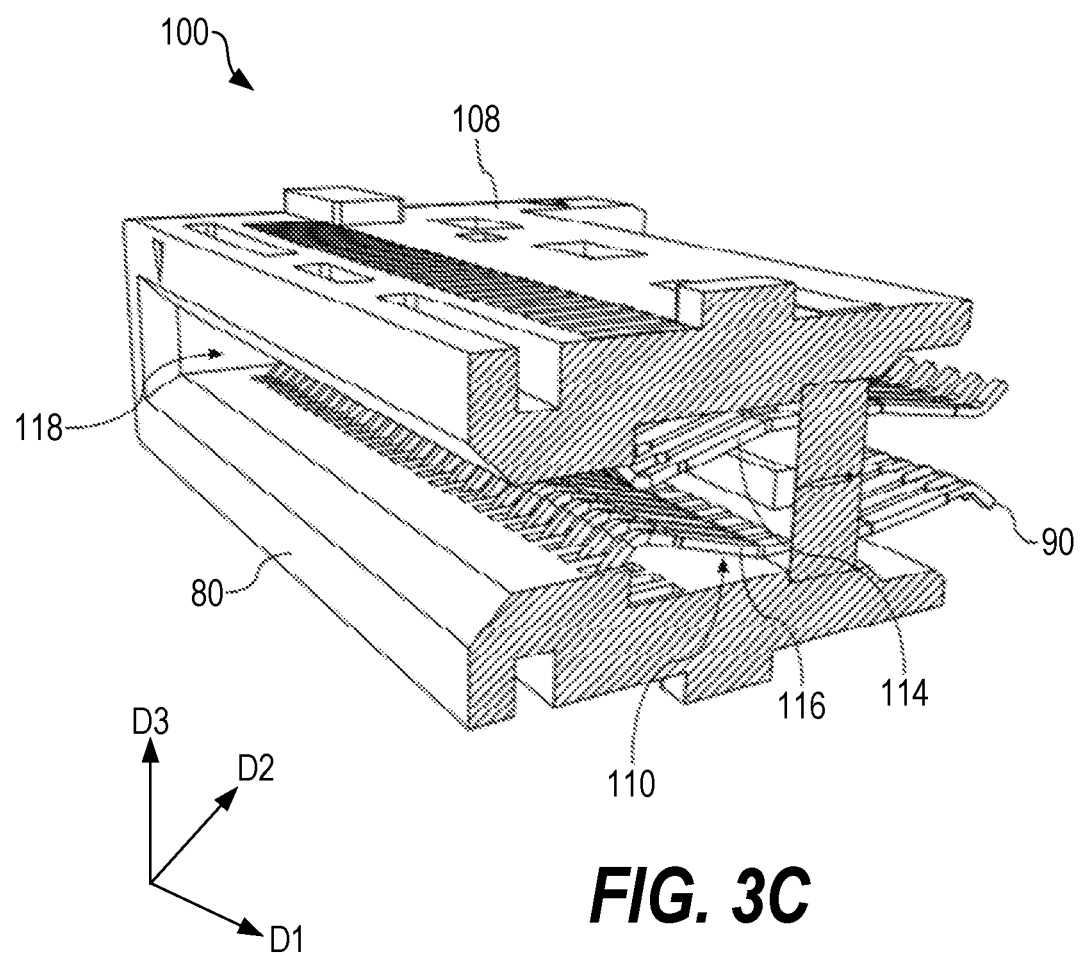
FIG. 3C depicts a cross sectional view of the cable interface device of FIG. 3A according to example embodiments of the present disclosure.

With reference to FIG. 3C, a cross-sectional view of the cable interface device 100 of FIG. 3A is illustrated. The electrically conductive contacts 110 of the cable interface device 100 include the first row of electrically conductive contacts 114 and the second row of electrically conductive contacts 116, which together define a gap 118 therebetween, with the gap 118 extending in the third direction D3. The electrically conductive contacts 110 at least partly extend between the front side 80 and the back side 90 of the cable interface device 100. Thus, the electrically conductive contacts 110 provide a connection between respective components (e.g., printed circuit boards) when they are inserted in both the front side 80 and the back side 90 of the cable interface device 100. More particularly, in at least certain exemplary aspects, the electrically conductive contacts 110 may provide a connection between the data storage connectors 74 of the data storage media 70 at the front side 80 (FIG. 2) and one or more connectors (e.g., printed circuit boards) of the cables 50 at the back side 90.

The electrically conductive contacts 110 can include any suitable material or materials for electrical communication to facilitate the flow of data, signals, power, or the like. For example, in some embodiments, the plurality of electrically conductive contacts 110 can include copper contacts. In some embodiments, the electrically conductive contacts 110 may include additional or alternative conductive materials such as, but not limited to, silver, gold, platinum, or palladium, or alloys thereof, which may be selectively plated thereon in some implementations.

Moreover, as stated above with respect to the connector 30, the electrically conductive contacts 110 may at least partly be configured in accordance with one or more industry connection standards based on the utilization of the cable interface device 100. For example, in some embodiments, the plurality of electrically conductive contacts 110 may be configured in a straddle mount configuration. In some embodiments, the electrically conductive contacts 110 may be configured in accordance with 1C, 2C, and/or 4C type connectors, such as to receive a data storage media 70 (e.g., solid-state data storage media) having an EDSFF E3 form factor (FIG. 2).

Referring again to FIGS. 3A and 3B, the body 101 includes various external features to assist in the alignment, securement, and/or mechanical rigidity of the cable interface device 100. For example, as illustrated in FIGS. 3A and 3B, the body 101 includes or defines a cable interface device locating feature. More specifically, for the embodiment illustrated in FIGS. 3A and 3B, the body 101 includes mounting studs 150. As used herein, mounting studs 150 refer to a portion of material or materials that extend away or project laterally from the body 101. As illustrated in FIG. 3B, the cable interface device 100 in particular includes a first mounting stud 152 on the top wall 102 extending away from the body 101. More specifically, the first mounting stud 152 is disposed on a top exterior surface 103 of the top wall 102 and extends outwardly away from the body 101. Likewise, as illustrated in FIG. 3A, the cable interface device 100 also includes a second mounting stud 154 disposed on the bottom wall 104 extending away from the body 101. More specifically, the second mounting stud 154 is disposed on a bottom exterior surface 105 of the bottom wall 104 and extends outwardly away from the body 101.

The first mounting stud 152 and the second mounting stud 154 are, in the embodiment shown, disposed at offset locations on the top wall 102 and bottom wall 104, respectively, to provide multiple alignment features. As used herein, offset in a direction refers to one element being disposed farther in one direction than another element.

Figure 3D:
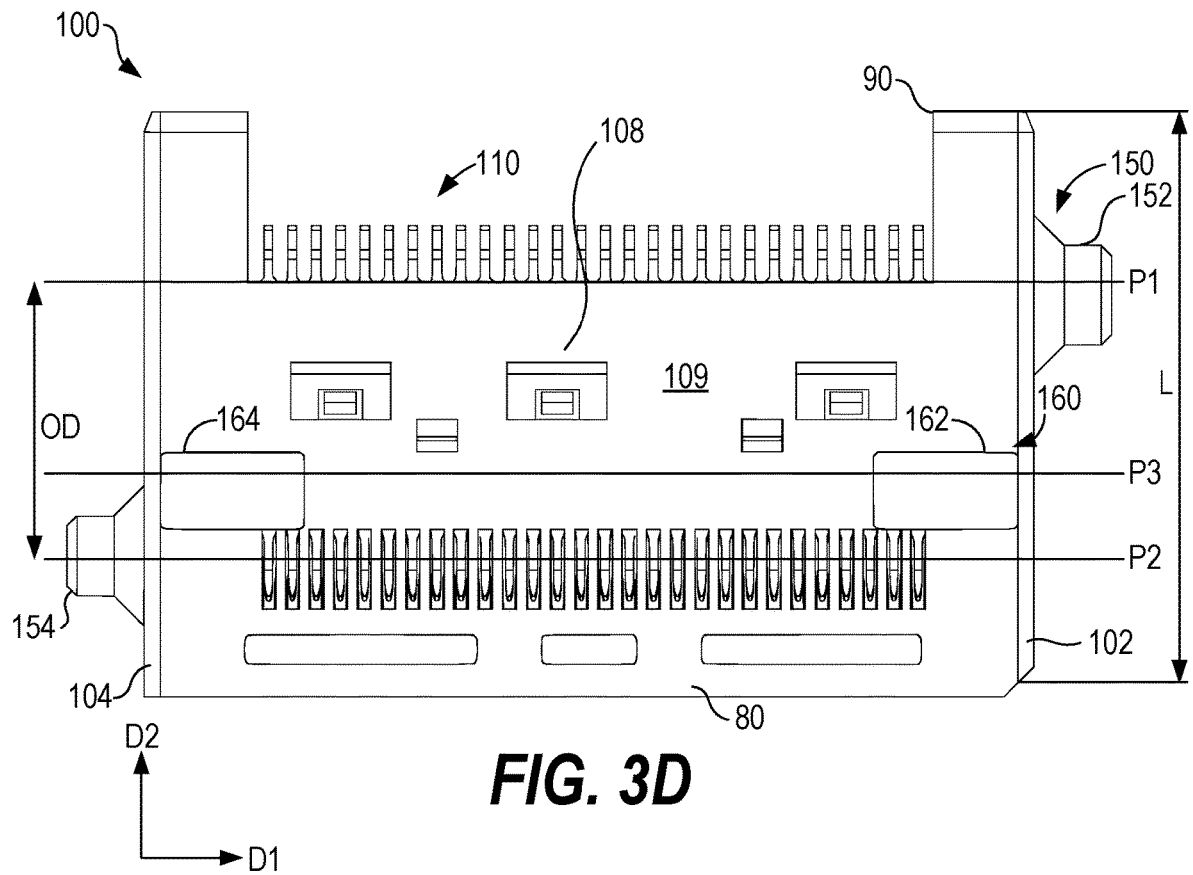
FIG. 3D depicts a right side view of a cable interface device according to example embodiments of the present disclosure.

With reference to FIG. 3D, a right-side view of the cable interface device 100 of FIGS. 3A-3C is illustrated showing the right exterior surface 109 of the right wall 108 in accordance with one or more exemplary embodiments. As shown in FIG. 3D, the first mounting stud 152 and the second mounting stud 154 are offset in the second direction D2, which is perpendicular to the first direction D1 (e.g., the direction in which the plurality of electrically conductive contacts 110 are disposed along the body 101). In particular, for the embodiment shown, the first mounting stud 152 is disposed on the top wall 102 at a first position P1 in the second direction D2. Likewise, the second mounting stud 154 is disposed on the bottom wall 104 at a second position P2 in the second direction D2 that is offset from the first position P1. The first position P1 of the first mounting stud 152 is offset in the second direction D2 from the second position P2 of the second mounting stud 154 by an offset distance OD.

In some embodiments, the offset distance OD may be greater or equal to 10 percent of a total length L of the body 101 (e.g., the distance the body extends in the second direction D2 between the front side 80 and the back side 90). In some embodiments, the offset distance OD may be greater or equal to 20 percent of the total length L of the body 101. In some embodiments, the offset distance OD may be greater or equal to 30 percent of the total length L of the body 101. In some embodiments, the offset distance OD may be between 10 percent and 90 percent of the length of the body 101. In some embodiments, the offset distance OD may be between 20 percent and 80 percent of the length of the body 101. In some embodiments, the offset distance OD may be between 30 percent and 70 percent of the length of the body 101.

Figure 3E:
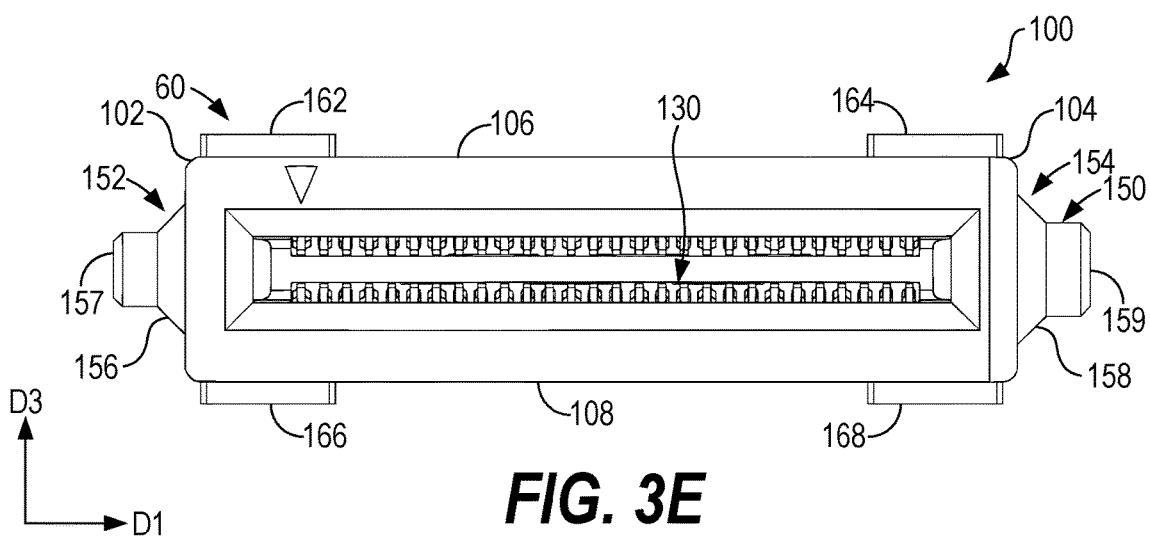
FIG. 3E depicts a front view of a cable interface device according to example embodiments of the present disclosure.

With reference to FIG. 3E, a front view of the cable interface device 100 of FIGS. 3A-3D is illustrated. In the embodiment shown, the first mounting stud 152 and the second mounting stud 154 are aligned in the third direction D3, which is perpendicular to both the first direction D1 and the second direction D2. Such a configuration may allow for a relatively narrow design in the third direction D3.

It can be appreciated, however, that in some embodiments, the first mounting stud 152 and the second mounting stud 154 may alternatively be offset in the third direction D3, such that one of the first mounting stud 152 and the second mounting stud 154 is closer to one of the left wall 106 and the right wall 108 and the other of the first mounting stud 152 and the second mounting stud 154 is closer to the other of the left wall 106 and the right wall 108. Such a configuration may provide for more rigidity of the cable interface device 100 within the cable interface housing 200. As illustrated in the figures, the cable interface device 100 includes two mounting studs 150 such that the first mounting stud 152 is on the top wall 102 and the second mounting stud 154 is on the bottom wall 104.

However, in some embodiments, one or both of the top wall 102 and the bottom wall 104 may include a multitude of mounting studs 150. For example, the top wall 102 may include a multitude of mounting studs 150 while the bottom wall 104 includes a single mounting stud 150.

In such embodiments, the first mounting stud 152 on the top wall 102 at the first position P1 may still be offset in the second direction D2 from the second mounting stud 154 on the bottom wall 104 and the second position P2. However, the top wall 102 and/or the bottom wall 104 may include one or more additional mounting studs (not shown). For example, an additional mounting stud may be disposed on the top wall 102 at the second position P2 in the second direction D2 such that the additional mounting stud on the top wall 102 is aligned with the second mounting stud 154 on the bottom wall 104. Alternatively, the additional mounting stud on the top wall 102 may be at a unique position in the second direction D2 such that the additional mounting stud is also offset from the second mounting stud 154 in the second direction D2. Likewise, the bottom wall 104 may include one or more additional mounting studs that are aligned with, or offset from, the first mounting stud 152 on the top wall 102.

The mounting studs 150 may include a variety of different shapes and sizes to facilitate the alignment, securement, and mechanical rigidity of the cable interface device 100. For example, in some embodiments, the mounting studs 150 may include a single continuous extension having a substantially constant cross-sectional shape. Alternatively, one or more of the mounting studs 150 can include a configuration having a varying cross-sectional shape.

With continued reference to the embodiment illustrated in FIG. 3E, one or more of the mounting studs 150 include a flared base and an outward extension. That is, the first mounting stud 152 includes a first flared base 156 and a first outward extension 157. The first flared base 156 extends from the top wall 102 before transitioning to the first outward extension 157. Additionally, in the embodiment shown, the second mounting stud 154 includes a second flared base 158 and a second outward extension 159. The second flared base 158 similarly extends from the bottom wall 104 before transitioning to the second outward extension 159. In such embodiments, the first flared base 156 and/or the second flared base 158 may assist in the alignment and seating of the cable interface device 100 with adjacent components, as will be described. The outward extensions 157, 159 can include contoured or rounded corners, which may facilitate placement of the mounting studs 150 in a receptacle, as will be described.

In addition to the mounting studs 150, the body 101 can include one or more additional or alternative external features to assist in the alignment, securement, and/or mechanical rigidity of the cable interface device 100 (e.g., one or more additional or alternative cable interface device locating features). For example, referring back to FIGS. 3A and 3B, the body 101 includes one or more protrusions 160. As used herein, protrusions 160 refer to a projection of additional material on an exterior surface of the body 101. The cable interface device 100 includes one or more protrusions 160 on at least one side of the body 101 between top wall 102 and the bottom wall 104, where the one or more protrusions extend away from the body 101. More specifically, as illustrated in FIG. 3A, the cable interface device 100 includes one or more protrusions 160 (e.g., first protrusion 162 and second protrusion 164) on the right wall 108 of the body 101. Additionally, as illustrated in FIG. 3B, the cable interface device 100 includes one or more protrusions 160 (e.g., first protrusion 162 and second protrusion 164) on the left wall 106 of the body 101.

The one or more protrusions 160 can include a shape configured to align with a slot on an adjacent component, as can be appreciated, e.g., from the discussion below. Thus, once the one or more protrusions 160 are aligned with and positioned in respective slots of an adjacent component, the cable interface device 100 can smoothly be inserted into, connected with, or otherwise mated with the adjacent component in proper alignment. Moreover, the one or more protrusions 160 may be configured to provide additional structural rigidity to the cable interface device 100. For example, the one or more protrusions 160 depicted include an elongated shape that extends farther in the first direction D1 than in the second direction D2. That is, the one or more protrusions 160 would essentially serve as an external structural support rib by providing additional material along the first direction D1. The one or more protrusions 160 could thereby help resist bending, or even snapping, of the cable interface device such as during insertion or removal connection operations.

In some embodiments, the cable interface device 100 can include at least two protrusions 160. For example, with reference to FIG. 3E, the front view of the cable interface device 100 is illustrated. The cable interface device 100 includes a first protrusion 162 and a second protrusion 164 disposed on the left wall 106. Furthermore, the cable interface device 100 includes a third protrusion 166 and fourth protrusion 168 on the right wall 108.

While illustration is made of the cable interface device 100 having two protrusions 160 on each of the left wall 106 and the right wall 108, it should be appreciated that any variation in the number of protrusions 160, or lack thereof, on the left wall 106 and the right wall 108 may also be realized within the scope of this disclosure. For example, in alternative exemplary embodiments the cable interface device 100 may include a single protrusion on the left wall 106 and a single protrusion on the right wall 108.

In embodiments where the cable interface device includes a plurality of protrusions 160, two or more of the respective protrusions 160 may be aligned with one another in the first direction D1. For instance, as best illustrated in FIG. 3D, the right wall 108 of the body 101 of the cable interface device 100 includes the first protrusion 162 and the second protrusion 164. The first protrusion 162 and the second protrusion 164 are aligned in the first direction D1. Such embodiments can allow for both the first protrusion 162 and the second protrusion 164 to be inserted into the same slot of an adjacent component. Moreover, the first protrusion 162 and the second protrusion 164 are aligned at a third position P3 that is different than, with respect to the second direction D2, the first position P1 of the first mounting stud 152 and/or the second position P2 of the second mounting stud 154. In some embodiments, the protrusions 160 (e.g., the first protrusion 162 and second protrusion 164) may be between the first mounting stud 152 and the second mounting stud 154 in the second direction D2.

Similarly, for the embodiment of FIGS. 3A through 3E, it will be appreciated that the third protrusion 166 and fourth protrusion 168 are also aligned in the first direction D1. In the embodiment shown, the third protrusion 166 and fourth protrusion 168 are also located at the third position P3. However, in other embodiments, the third protrusion 166 and fourth protrusion 168 may be offset from the third position P3 along the second direction D2.

Referring again to FIGS. 3A and 3B, the cable interface device 100 further includes one or more connection slots 190 in the left wall 106 and/or the right wall 108 of the body 101. The one or more connection slots 190 include a plurality of slots (e.g., apertures, passageways, cavities, or the like) to facilitate connections with the cable interface device 100 and additional components. For instance, as depicted, the body 101 includes a first set of connection slots 191 and/or a second set of connection slots 192. The second set of connection slots 192 can allow for mechanical connections with adjacent components that are inserted into the body. The first set of connection slots 191 can include void areas to reduce material during manufacture of the cable interface device 100. Likewise, the body 101 includes a third set of connection slots 193 that are aligned with the plurality of electrically conductive contacts 110. Such embodiments allow for the plurality of electrically conductive contacts 110 and bend into the third set of connection slots 193 when an adjacent component is inserted into the cable interface device 100.

The body 101 of the cable interface device 100 (or the body of the connector 30), including the mounting studs 150 and the protrusions 160, can be manufactured in a variety of configurations. In the exemplar embodiment depicted in FIGS. 3A through 3E, the body 101 includes a single unitary structure. For example, the body 101 can be molded, injection molded, cast, or otherwise formed as a single component with no subsequent assembly required. Alternatively, in some embodiments, the body 101 may include a plurality of subcomponents that are connected to one another to form the overall body 101.

For example, one or more of the top wall 102, bottom wall 104, left wall 106, and right wall 108 may be molded, injection molded, cast, or otherwise formed individually wherein the various components are subsequently connected to one another to form the overall body 101. In such embodiments, the individual subcomponents may be connected via bonding, welding, adhesion, mechanical connectors (e.g., screws, pins, or the like), or any other suitable connection technique or combination thereof. Moreover, the body 101 can be formed of any material or materials that are suitable for mechanically supporting electrical connections between one or more cables and one or more data storage media. For example, the body 101 may include a polymeric- or resin-based material with insulative properties.

Figure 4:
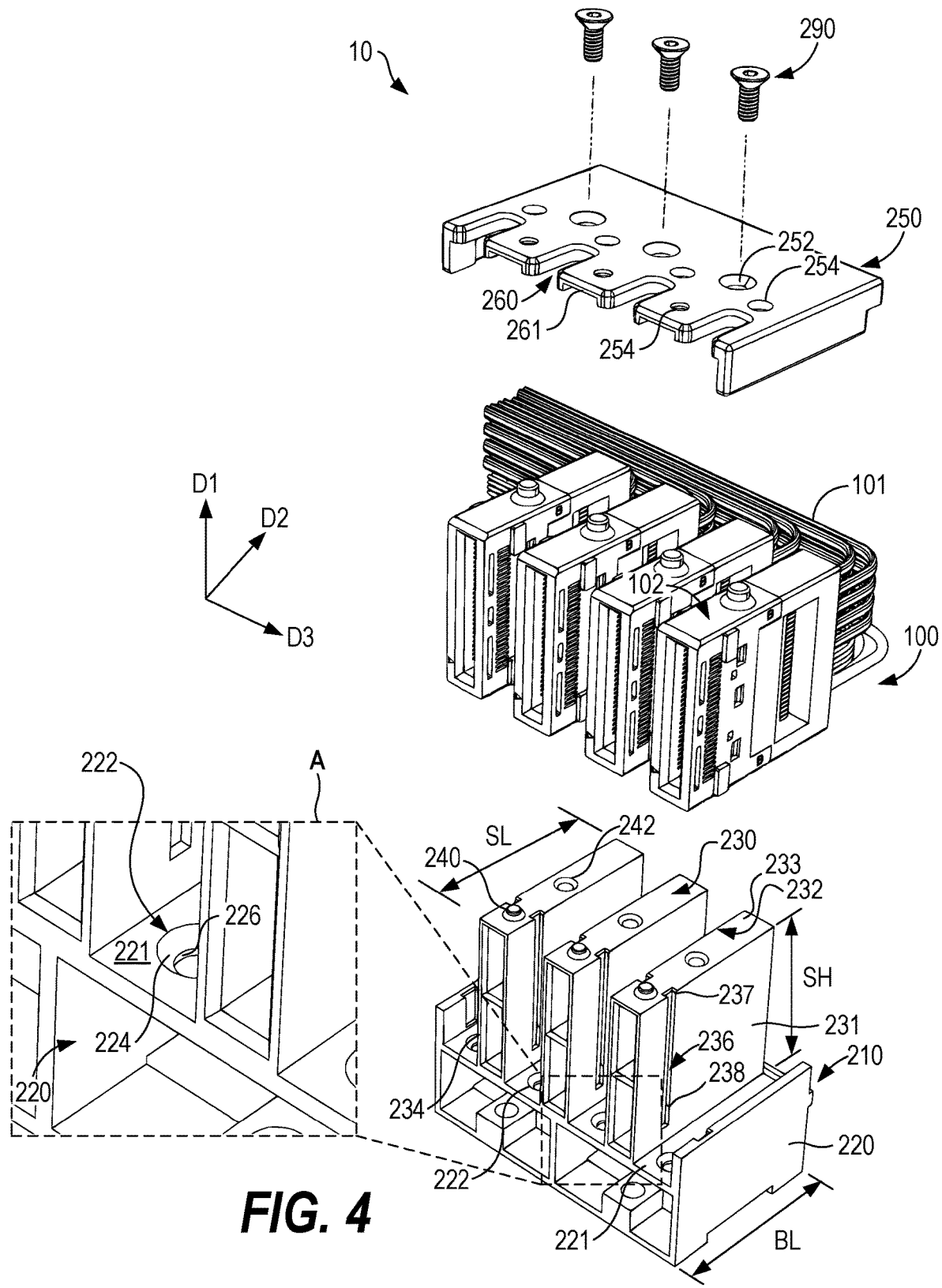
FIG. 4 depicts a perspective view of an unassembled mounting assembly including four cable interface devices and a cable interface housing according to example embodiments of the present disclosure.
Figure 5:
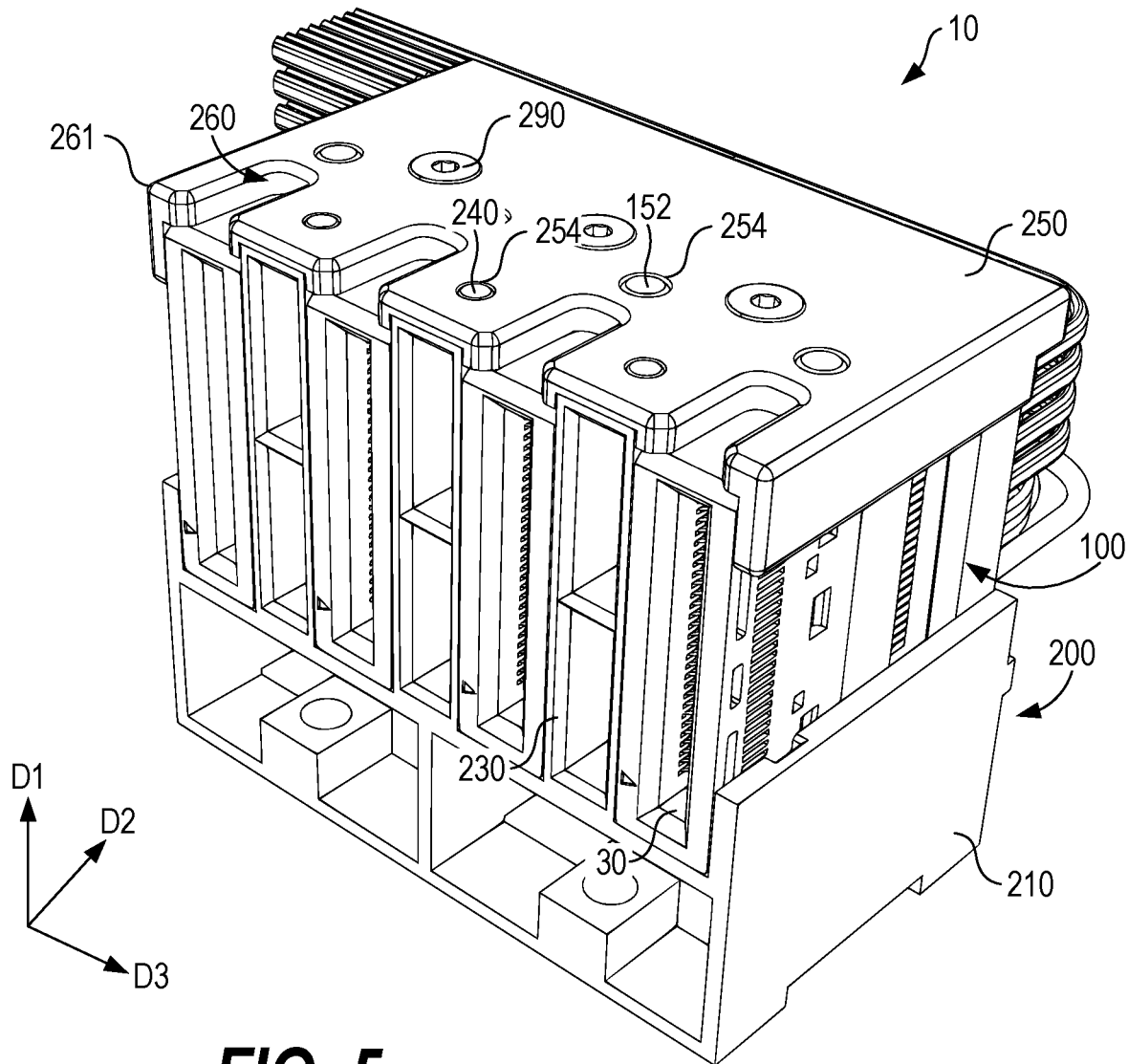
FIG. 5 depicts an assembled mounting assembly including four cable interface devices and a cable interface housing according to example embodiments of the present disclosure.

Referring now to FIGS. 4 and 5, the exemplary mounting assembly 10 introduced above will be described in more detail. FIG. 4 is an exploded view of the mounting assembly 10 and FIG. 5 is an assembled view of the mounting assembly 10. Referring to FIGS. 4 and 5 collectively, the mounting assembly 10 includes one or more cable interface devices 100 and a cable interface housing 200. The cable interface devices 100 of FIGS. 4 and 5 can be configured in the same manner as the cable interface device 100 described above with reference to, e.g., FIGS. 3A-3E. The cable interface housing 200 depicted in FIGS. 4 and 5 is the same cable interface housing 200 briefly introduced above with reference to FIGS. 1 and 2.

As is illustrated, the cable interface housing 200 includes a frame 210 and a top housing 250 configured to fixedly or detachably attach to the frame 210. When the mounting assembly 10 is assembled, as shown in FIG. 5, the frame 210 and the top housing 250 cooperate to secure one or more cable interface devices 100 to form the mounting assembly 10. The cable interface housing 200 and its components can be made from various materials and manufacturing methods, such as, for example, die cast metal components. While FIG. 4 illustrates the frame 210 and the top housing 250 as being two separate components detachably attachable to one another, in alternative embodiments, the frame 210 and the top housing 250 are integral with one another.

Referring to FIGS. 4 and 5 collectively, the frame 210 of the cable interface housing 200 includes a base 220 and one or more spacers 230 extending from the base 220 in the first direction D1. The base 220 includes an upper base surface 221 sized and configured to support the bottom wall 104 of one or more cable interface devices 100. For example, the base 220 of the frame 210 includes a flat surface to compliment the flat surface of the bottom wall 104 of each cable interface device 100 (with the exception of the second mounting stud 154 discussed herein). Moreover, as depicted, the base 220 of the frame 210 is sized to have a base length BL in the second direction D2 that is within 25% of the total length L, such as within 10% of the total length L of the cable interface device 100 in the second direction D2. However, it should also be appreciated that the base length BL of the frame 210 of the cable interface housing 200 may alternatively be greater than or less than the total length L of the cable interface device 100.

To assist with locating the cable interface device 100 within the cable interface housing 200, the frame 210, the top housing 250, or both includes or defines a cable interface housing locating feature. The cable interface device locating feature that is positioned on, or defined by, the body 101 of the cable interface device 100 is complementary in shape to the cable interface housing locating feature. In such a manner, the cable interface housing locating feature and the cable interface device locating feature are configured to locate the cable interface device 100 within the cable interface housing 200. More specifically, it can be appreciated that, for the embodiment shown, the cable interface device locating feature is a first mounting stud 152 positioned on the top wall 102 and extending away from the body 101, and further includes a second mounting stud 154 positioned on the bottom wall 104 and extending away from the body 101 (FIG. 3A).

To accommodate the first and second mounting studs 152, 154 of the one or more cable interface devices 100, the cable interface housing locating feature is configured as a top housing recess 254 defined by the top housing 250, and the frame 210 further defines a frame recess 222.

More specifically, the upper base surface 221 of the base 220 defines a multitude of frame recesses 222. The frame recesses 222 are sized, shaped, and positioned to receive and align with the second mounting studs 154 on the bottom walls 104 of the cable interface devices 100 when the cable interface devices 100 are disposed in the cable interface housing 200 to form the overall mounting assembly 10.

For instance, referring particularly to the callout region A in FIG. 4, the frame recesses 222 include a hole extending through the upper base surface 221 and into, and potentially all the way through, the base 220 of the frame 210. In some embodiments, the frame recesses 222 may be substantially circular to accommodate a second mounting stud 154 that is substantially cylindrical. In particular, in the embodiment shown, the frame recesses 222 each include a sloped edge 224 leading into a subsequent hole extension 226, such as to accommodate a second mounting stud 154 having a second flared base 158 and a second outward extension 159 (FIG. 3E). That is, the sloped edges 224 of the frame recess 222 receive the second flared base 158 of the second mounting stud 154 while the subsequent hole extension 226 receives the second outward extension 159 of the second mounting stud 154. However, it should be appreciated that in other embodiments, the frame recesses 222 may be configured in any other suitable manner to receive corresponding second mounting studs 154.

The frame 210 of the cable interface housing 200 further includes one or more spacers 230 extending from the base 220 in the first direction D1. The spacers 230 provide for separation between adjacent cable interface devices 100 disposed in the mounting assembly 10, as well as assist with the alignment thereof during insertion and removal. Each spacer 230 generally includes a first side 231 and second side 232 opposing the first side 231, where the first side 231 and the second side 232 are disposed adjacent respective cable interface devices 100 when separated by the spacer 230. Each spacer 230 further includes a top side 233 extending between the first side 231 and the second side 232. The first side 231, second side 232, and top side 233 can define an interior 234 of the spacer 230. In some embodiments, the interior 234 is substantially hollow. Such embodiments provide an air gap between adjacent cable interface devices 100 for thermal management, such as by accommodating airflow between adjacent cable interface devices 100 and/or simply providing an insulation space between adjacent cable interface devices 100.

In some embodiments, the spacers 230 extend along the base 220 of the frame 210 in the second direction D2 for a spacer length SL that is substantially similar to the frame length of the frame 210. However, in some embodiments, the spacer length SL is less than the base length BL, such that the spacers 230 do not extend beyond the base 220 of the frame 210.

The one or more spacers 230 include one or more features to assist in the alignment and securement of the one or more cable interface devices 100 in the cable interface housing 200. For example, referring particularly to FIG. 4, the one or more spacers 230 define one or more slots 236 to receive the protrusions 160 on the cable interface devices 100. That is, the one or more slots 236 include elongated recesses in the first side 231 and/or second side 232 of each spacer 230, wherein the elongated recesses extend in the first direction D1.

For instance, each slot 236 extends between a first end 237 at the top side 233 of the spacer 230 and a second end 238 farther down the spacer 230 in the first direction D1. The first end 237 is an open end (e.g., not blocked by the top side 233) such that the protrusion 160 on the cable interface device 100 can slide into the first end 237 of the slot 236 when the cable interface device 100 is inserted into the frame 210 of the cable interface housing 200. As illustrated in FIG. 4, the second end 238 is a terminated end somewhere in the first side 231 or second side 232. Alternatively, the second end 238 may be at the opposite side of the spacer 230 compared to the top side 233 such that the slot 236 extends for the entire spacer height SH of the spacer 230. The slots 236 can be sized and positioned to receive the protrusions 160 such that the cable interface device 100 can otherwise be flush, or at least parallel with, the spacer 230.

In some embodiments, such as that illustrated in FIGS. 4 and 5, the top side 233 of the spacers 230 include one or more frame studs 240 and/or one or more frame securement holes 242 (FIG. 4) for aligning and securing the frame 210 with the top housing 250. The frame studs 240 refer to a material or materials that extend away from the spacer 230 in the first direction D1. More specifically, the one or more frame studs 240 are disposed on the top sides 233 of the one or more spacers 230 and extend outwardly away from the spacers 230.

The frame studs 240 include a variety of different shapes and sizes to facilitate the alignment, securement, and mechanical rigidity of the frame 210 to the top housing 250. For example, in some embodiments, the frame studs 240 include a single continuous extension having a substantially constant cross-section shape. Alternatively, one or more of the frame studs 240 include a configuration having a varying cross-sectional shape.

The frame securement holes 242 on the top sides 233 of the spacers 230 are used to receive and engage connectors 290 (e.g., threaded screws) to secure the top housing 250 with the frame 210. That is, the frame securement holes 242 align with top housing securement holes 252 (FIG. 4) such that connectors 290 pass through the top housing securement holes 252 and engage with the frame securement holes 242 to connect the top housing 250 to the frame 210. The connectors 290 include any structural element that can engage with the frame 210 via the frame securement holes 242. For example, the connectors 290 may include a threaded connector (e.g., screws, bolts, or the like) that engages with a complimentary threaded frame securement hole 242.

With continued reference to FIGS. 4 and 5, the cable interface housing 200 further includes the top housing 250, which cooperates with the frame 210 to secure one or more cable interface devices 100 to form the overall mounting assembly 10. The top housing 250 is sized and configured to engage with frame 210, and more specifically, the top side 233 of the spacers 230 of the frame 210, to secure the one or more cable interface devices 100 in place.

The top housing 250 includes one or more features to assist in the alignment and securement of the one or more cable interface devices 100 in the cable interface housing 200. For example, similar to the frame recesses 222 in the frame 210, the top housing 250 includes a plurality of top housing recesses 254. The top housing recesses 254 are used to accommodate the first mounting studs 152 of the one or more cable interface devices 100 and the frame studs 240 on the top side 233 of the spacers 230 of the frame.

The plurality of top housing recesses 254 are sized, shaped, and positioned to receive and align with the first mounting studs 152 on the cable interface devices 100. The plurality of top housing recesses 254 are also sized, shaped, and positioned to receive and align with the frame studs 240 on the frame 210 when the cable interface devices 100 are disposed in the cable interface housing 200 to form the overall mounting assembly 10.

For instance, the top housing recesses 254 include a hole extending into, and potentially all the way through the top housing 250. In some embodiments, the top housing recesses 254 are circular to accommodate a first mounting stud 152 or frame stud 240, respectively, that is substantially cylindrical. The top housing recesses 254 may each be configured in a similar manner as the frame recesses 222. For example, in some embodiments, the top housing recesses 254 may include sloped edges leading into a subsequent hole extension, such as to accommodate a first mounting stud 152 having a first flared base 156 and a first outward extension 157, or frame stud 240 having a similar design. That is, the sloped edges of the top housing recesses 254 can receive the first flared base 156 of the first mounting stud 152 while the subsequent hole extension can receive the first outward extension 157 of the first mounting stud 152. However, it should be appreciated that in other exemplar embodiments, the top housing recesses 254 may be configured in any other suitable manner to receive corresponding first mounting studs 152, frame studs 240, or both.

The top housing 250 further includes top housing securement holes 252 that receive and engage the connectors 290 to secure the top housing 250 with the frame 210. That is, the top housing securement holes 252 align with the frame securement holes 242 such that the connector 290 passes through both the top housing securement holes 252 and the frame securement holes 242 to connect the top housing 250 to the frame 210.

The top housing 250 further defines one or more relief slots 260. As illustrated in FIGS. 4 and 5, the one or more relief slots 260 are disposed at the front edge 261 of the top housing 250, i.e., the side facing the data storage media 70 when present (FIG. 2). The relief slots 260 include a cutout of material extending into the top housing 250 from the front edge 261.

With additional reference to FIG. 2, the one or more relief slots 260 provide accommodation for additional protruding connectors of a data storage media 70 that are not being inserted into the connector 30 of the mounting assembly 10, and more specifically into the opening 32 at the front side 80 of the body 101. Thus, the mounting assembly 10 provides flexibility with respect to the configuration of data storage media being inserted into the cable interface devices 100. For instance, as illustrated in FIG. 2, the mounting assembly 10, and more specifically the cable interface device 100, is configured for a 1C connector. However, due to the presence of the relief slots 260, data storage media 70 in the configurations of 2C or even 4C (as illustrated) may be accommodated by the mounting assembly. That is, one of the data storage connectors 74 of the data storage media 70, which may be a printed circuit board associated with the 2C and/or 4C configuration, can slide into the relief slot 260, while one of the data storage connectors 74 of the data storage media 70, which may be a printed circuit board associated with the 1C configuration, slides into the connector 30 of the mounting assembly, and more specifically into the opening 32 at the front side 80 of the body 101.

The frame 210 and the top housing 250 also provide modular flexibility for the cable interface housing 200. For instance, in some embodiments, a single type of frame 210 may be provided of common dimensions. However, a plurality of top housings 250 of varying dimensions to respectively engage different sized cable interface devices 100 may each be capable of engaging with the single type of frame 210. That is, different top housings 250 may be respectively sized to accommodate different cable interface devices 100 having different dimensions (e.g., having different connectors), each while being connectable to the type of frame 210. Such embodiments allow for parts reduction by providing a single style frame 210 for cable interface housings 200, as opposed to multiple different sized frames 210, all while still accommodating cable interface devices 100 of varying shapes and sizes.

For instance, with reference to FIG. 5, the cable interface housing 200 of the mounting assembly 10 includes the frame 210 and the top housing 250 to accommodate the cable interface device 100. As illustrated, the cable interface device 100 includes a 1C connector. However, with reference to FIG. 6, a second mounting assembly 300 is illustrated including a second cable interface device 310 in a second cable interface housing 320. Unlike the cable interface device 100 illustrated in FIG. 5 being a 1C connector, the second cable interface device 310 illustrated in FIG. 6 is a 2C connector. Thus, the second cable interface device 310 depicted in FIG. 6 is taller than the cable interface device 100 of FIG. 5. The second cable interface housing 320 includes the same frame 210 as utilized in the mounting assembly 10 for the 1C connector. However, the second cable interface housing 320 includes a second top housing 350 to accommodate the second cable interface device 310 and its different connector type. As depicted, the second top housing 350 includes a top spacer 355 that extends downward toward the frame 210. The top spacer 355 combines with the spacer 230 to form a second mounting assembly 300 that is taller than the mounting assembly 10 of FIG. 5 to accommodate the taller second cable interface device 310 being a 2C connector.

Figure 7:
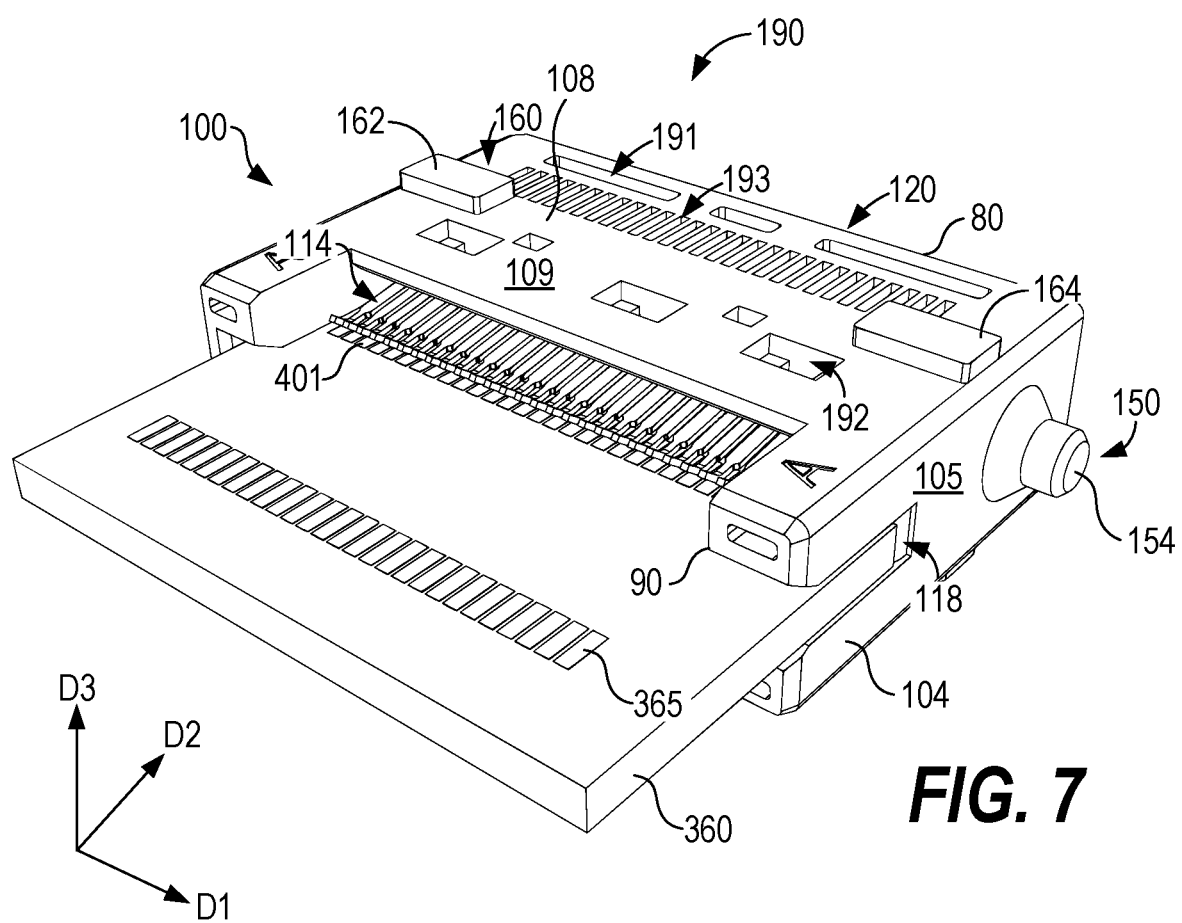
FIG. 7 depicts a perspective view of a cable interface device and a paddle card thereof according to example embodiments of the present disclosure.

Turning next to FIG. 7, a perspective view of a cable interface device 100 is shown having a paddle card 360 according to various embodiments. The paddle card 360 can include cables 50 soldered or otherwise coupled thereon. For instance, the paddle card 360 can include soldered hi-speed wires at positioned at a rear of the paddle card 360. The paddle card 360 can then be subsequently overmolded to form the cable interface device 100 of FIGS. 3A-3E. The data storage connectors 74 are configured to mate into the cable interface device 100 at the input end 120.

It should be appreciated that mounting assemblies disclosed herein can utilize cable interface devices having mounting studs, and potentially one or more protrusions, to assist with the alignment, securement, and mechanical rigidity of the cable interface devices in cable interface housings. The mounting assemblies disclosed herein provide modular flexibility for accommodating cable interface devices and data storage media of different size, shapes, and formats, particularly with respect to EDSFF E3 solid-state data storage media and type 1C, 2C, and 4C connectors.

Moreover, it will be appreciated that although the cable interface housing locating feature is configured as a recess and the cable interface device locating feature is configured as a mounting stud having a complimentary shape, in other exemplary embodiments, the cable interface housing locating feature and the cable interface device locating feature may additionally or alternatively be configured in any other suitable manner. For example, in other exemplary embodiments, the cable interface housing locating feature may be configured as a mounting stud and the cable interface device locating feature may be configured as a recess. Additionally, or alternatively, the cable interface housing locating feature and the cable interface device locating feature may have any other suitable complementary structure for constraining at least one degree of freedom between the cable interface housing and the cable interface device (e.g., lips, steps, ridges, chamfers, slots, channels, etc.). Further, it will be appreciated that each of the locating features described herein (e.g., holes 252; recesses 254, 222; studs 150, 240; slots 236; protrusions 160; etc.) may have any other suitable structure, as described in this paragraph.

The features, structures, or characteristics described above may be combined in one or more embodiments in any suitable manner, and the features discussed in the various embodiments may be interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A data storage assembly, comprising:
a data storage media comprising a media body defining an end, the data storage media further comprising a protruding connector extending away from the media body at the end;
a cable interface housing comprising a frame and a top housing separate from the frame, the cable interface housing further comprising or defining a cable interface housing locating feature; and
a cable interface device configured to mount within the cable interface housing, the cable interface device comprising:
a body extending in a first direction between a top wall and a bottom wall and extending in a second direction perpendicular the first direction between a front side and a back side, the body defining an opening at the front side with the protruding connector of the data storage media extended through the opening;
a plurality of electrically conductive contacts at least partially disposed inside the body and exposed to the opening, the plurality of electrically conductive contacts in electrical communication with the protruding connector of the data storage media and distributed between the top wall and the bottom wall; and
a cable interface device locating feature positioned on, or defined by, the body and complementary in shape to the cable interface housing locating feature, the cable interface housing locating feature and the cable interface device locating feature locating the cable interface device within the cable interface housing.

2. The data storage assembly of claim 1, wherein the data storage media is a solid-state drive having an EDSFF E3 form factor, and wherein the protruding connector is a 1C, 2C, or 4C connector type.

3. The data storage assembly of claim 1, wherein the top housing comprises a front edge along the front side of the cable interface device, and wherein the front edge defines a relief slot extending into the top housing in the first direction.

4. The data storage assembly of claim 3, wherein:
the protruding connector is a first protruding connector; and the data storage media further comprises a second protruding connector aligned with the first protruding connector, the second protruding connector extending into the relief slot.

5. The data storage assembly of claim 1, wherein:
the cable interface housing locating feature is a top housing recess defined by the top housing of the cable interface housing;
the frame defines a frame recess, and the cable interface device locating feature is a first mounting stud positioned on the top wall and extending away from the body;
the cable interface device further comprises a second mounting stud positioned on the bottom wall and extending away from the body; and
the first mounting stud is received within the top housing recess, and the second mounting stud is received within the frame recess.

6. The data storage assembly of claim 1, wherein the cable interface device is a first cable interface device of a plurality of cable interface devices of the data storage assembly, and wherein each cable interface device of the plurality of cable interface devices are mounted within the cable interface housing.

7. A cable interface device operable with a data storage media having a protruding connector, the cable interface device comprising:
a body extending in a first direction between a top wall and a bottom wall and extending in a second direction perpendicular the first direction between a front side and a back side, the body defining an opening at the front side for receiving the protruding connector of the data storage media;
a plurality of electrically conductive contacts at least partially disposed inside the body and exposed to the opening, the plurality of electrically conductive contacts being distributed between the top wall and the bottom wall and at least partially extend from the front side to the back side; and
at least one mounting stud extending away from the body.

8. The cable interface of claim 7, wherein the at least one mounting stud comprises a first mounting stud on the top wall extending away from the body and a second mounting stud on the bottom wall extending away from the body.

9. The cable interface device of claim 8, wherein the first mounting stud and the second mounting stud are offset in the second direction.

10. The cable interface device of claim 7, wherein the at least one mounting stud comprises a flared base.

11. The cable interface device of claim 7, further comprising at least one protrusion on at least one side of the body between the top wall and the bottom wall, the at least one protrusion extending away from the body.

12. The cable interface device of claim 11, wherein the cable interface device comprises at least two protrusions aligned in the first direction.

13. The cable interface device of claim 12, wherein the at least two protrusions comprises a first protrusion and a second protrusion on a first side of the body.

14. The cable interface device of claim 11, wherein the at least one protrusion comprises an elongated shape that extends farther in the first direction than the second direction.

15. The cable interface device of claim 7, wherein:
the plurality of electrically conductive contacts comprises a first row of electrically conductive contacts and a second row of electrically conductive contacts; and
the first row of electrically conductive contacts and the second row of electrically conductive contacts are parallel to one another and together define a gap therebetween for receiving the protruding connector.

16. The cable interface device of claim 7, wherein the data storage media has an EDSFF E3 form factor, and the protruding connector is one of a 1C, 2C, and 4C connector type.

17. A mounting assembly, comprising:
a cable interface housing comprising a frame and a top housing separate from the frame, the frame, the top housing, or both comprising or defining a cable interface housing locating feature; and
a cable interface device, the cable interface housing at least partially surrounding the cable interface device, wherein the cable interface devices comprises:
a body extending in a first direction between a top wall and a bottom wall and extending in a second direction perpendicular the first direction between a front side and a back side, the body defining an opening at the front side;
a plurality of electrically conductive contacts at least partially disposed inside the body and exposed to the opening, wherein the plurality of electrically conductive contacts are distributed between the top wall and the bottom wall and at least partially extend from the front side to the back side; and
a cable interface device locating feature positioned on, or defined by, the body and complementary in shape to the cable interface housing locating feature, the cable interface housing locating feature and the cable interface device locating feature configured to locate the cable interface device within the cable interface housing.

18. The mounting assembly of claim 17, wherein the mounting assembly is operable with a data storage media having a protruding connector, and the opening at the front side of the body of the cable interface housing is configured to receive the protruding connector.

19. The mounting assembly of claim 18, wherein the data storage media has an EDSFF E3 form factor, and the protruding connector is one of a 1C, 2C, and 4C connector type.

20. The mounting assembly of claim 17, wherein:
the cable interface housing locating feature is a top housing recess defined by the top housing of the cable interface housing;
the frame defines a frame recess;
the cable interface device locating feature is a first mounting stud positioned on the top wall and extending away from the body;
the cable interface device further comprises a second mounting stud positioned on the bottom wall and extending away from the body; and
the first mounting stud is received within the top housing recess, and wherein the second mounting stud is received within the frame recess.

21. The mounting assembly of claim 17, wherein the cable interface device is a first cable interface device of a plurality of cable interface devices of the mounting assembly, and wherein each cable interface device of the plurality of cable interface devices are mounted within the cable interface housing.

* * * * *